United States Patent

Tomlinson

[15] 3,704,729
[45] Dec. 5, 1972

[54] PLUMBING DEVICE

[72] Inventor: Thomas Alfred Tomlinson, 348 Manor Road East, Toronto 298, Ontario, Canada

[22] Filed: Dec. 21, 1971

[21] Appl. No.: 210,438

Related U.S. Application Data

[63] Continuation-in-part of Ser. No. 19,167, March 13, 1970, abandoned.

[52] U.S. Cl. ............... 138/90, 220/24.5, 285/338
[51] Int. Cl. .................................. F16l 55/10
[58] Field of Search .......... 138/89, 90, 97; 85/72, 75, 85/76; 29/256, 263; 215/54; 217/109; 220/24.5; 254/100; 4/257; 285/8, 196, 338, 346

[56] References Cited

UNITED STATES PATENTS

| | | | |
|---|---|---|---|
| 1,631,889 | 6/1927 | Rappley | 29/256 X |
| 2,322,842 | 6/1943 | French | 138/89 |
| 2,519,693 | 8/1950 | Olin | 29/256 X |
| 3,326,243 | 6/1967 | Augustus | 138/90 |
| 3,420,274 | 1/1969 | Buttery | 138/90 |

FOREIGN PATENTS OR APPLICATIONS

| | | | |
|---|---|---|---|
| 98,176 | 10/1924 | Austria | 138/90 |

*Primary Examiner*—Herbert F. Ross
*Attorney*—J. Noel Walton

[57] ABSTRACT

A plumbing device for plugging a pipe includes a radially expansible rubber sleeve disposed about one end of an axial shaft or tube. An annular flange is provided on the end of the shaft while an elongated metal cylinder is disposed coaxially about the shaft on the opposite side of the sleeve to transmit axial compressive movement to the rubber sleeve from a screw jack mechanism releasably secured on the shaft in proximity to its other end.

12 Claims, 7 Drawing Figures

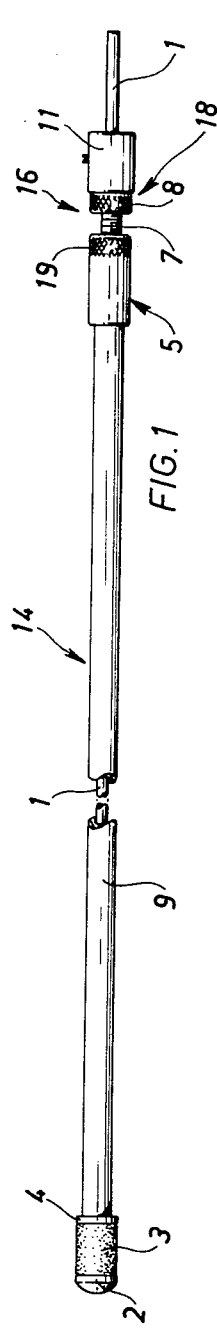
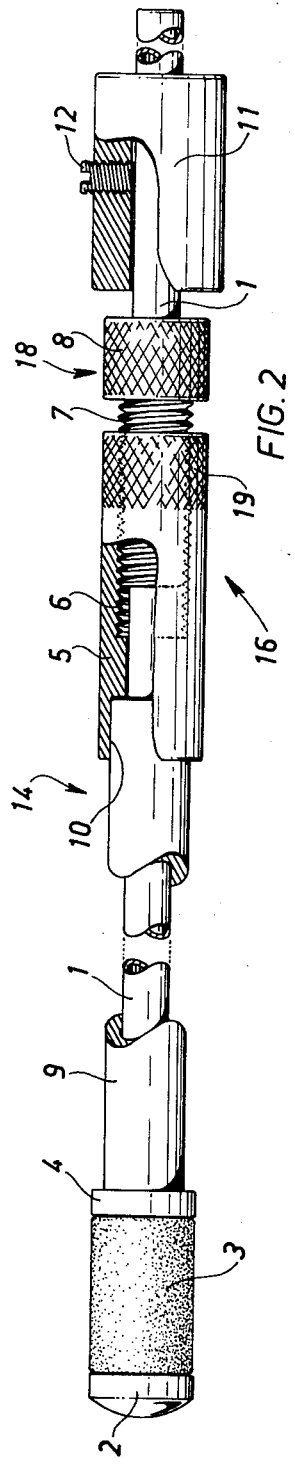
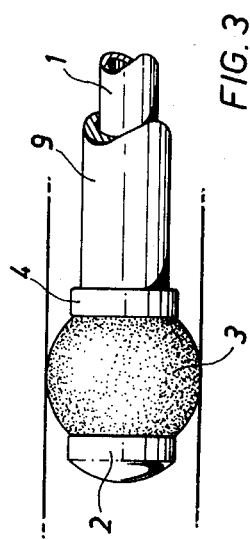

3,704,729

PLUMBING DEVICE

CROSS REFERENCE TO RELATED APPLICATION

This application is a continuation-in-part of my application Ser. No. 019,167, filed Mar. 13, 1970, entitled "PLUMBING DEVICE," and now abandoned.

BACKGROUND OF THE INVENTION

This invention relates to improvements in a plumbing device and more particularly to a device for temporarily restricting the flow of a fluid such as water through a pipe.

Various devices, or plugs as they are known, have heretofore been suggested for use for temporarily closing or sealing the open end of a pipe or conduit. Many of the known devices have, however, been relatively complex in their construction and have consequently proved to be relatively expensive to manufacture.

A principal object of this invention is to provide a plumbing device for the aforesaid purpose and which device is characterized by its structural simplicity, durability and reasonable cost of production.

Another object of this invention is to provide a plumbing device which can be used for temporarily sealing pipes or conduits of different diameters.

Other objects of the invention will become apparent as the description herein proceeds.

SUMMARY OF THE INVENTION

In accordance with this invention, there is provided a two-part jack by the use of which an expansible sleeve of a plumbing device can be expanded to close a pipe or conduit. By the use of such a two-part jack mechanism, the overall cost of such a device can be reduced while the device becomes even more versatile.

Other features of the invention and the practical advantages resulting therefrom will become apparent as the description herein proceeds.

BRIEF DESCRIPTION OF THE DRAWINGS

The invention will now be described merely by way of illustration with reference to the accompanying drawings in which:

FIG. 1 is a fragmentary side elevation of one embodiment of a plumbing device in accordance with this invention;

FIG. 2 is an enlarged and fragmentary side elevation, partly in section of the plumbing device shown in FIG. 1;

FIG. 3 is an elevational detail of the plumbing device shown in FIGS. 1 and 2 but showing an expansible plug or sleeve of that device in a longitudinally compressed and radially expanded form thereof;

DESCRIPTION OF THE PREFERRED EMBODIMENTS

Figure 4:
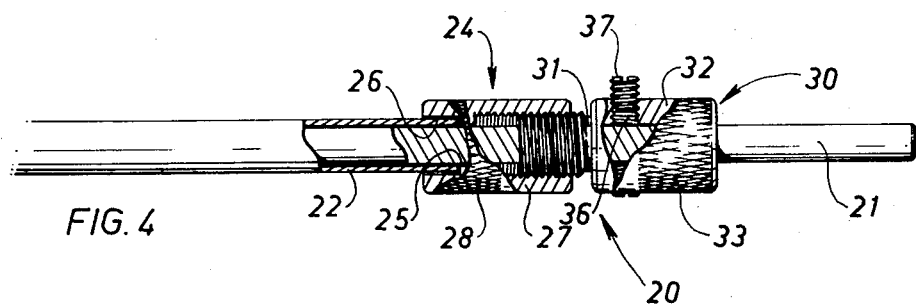
FIG. 4 is a fragmentary side elevation partly in section showing an alternative manner in which a releasable stop means can be provided for the jack mechanism of a plumbing device in accordance with this invention.

The plumbing device indicated generally at 14 in FIGS. 1 and 2 of the accompanying drawings comprises a drain tube 1 of the desired length and diameter and having a head or exterior flange 2 at one end thereof. A sealing plug or sleeve 3 in the form of a thick cylinder of a resiliently deformable material such as rubber or the like is coaxially disposed on the tube 1 for abutment with the flange 2, the plug 3 being radially expansible when compressed axially as shown in FIG. 3. On the side opposite the flange 2, the plug 3 abuts a washer 4 of approximately the same diameter as the flange 2. It is against this washer 4 that the plug-expanding axial force is applied.

The device 14 also comprises a jack mechanism generally indicated at 16 and which is mounted on the tube 1 remote from the plug 3, the jack mechanism 16 comprising a pair of coacting members, namely a first jack member 5 having an internally threaded socket 6 at one end and a second jack member 18 including an externally threaded portion or shank 7. The second jack member 18 has an enlarged knurled head 8 of the same external diameter as the first jack member 5, which is also externally knurled as indicated at 19 for at least a part of its length.

Between the washer 4 and the confronting end of the first jack member 5, an elongated cylinder 9 of appropriate length surrounds the drain tube 1, such cylinder 9 being desirably of less diameter than the washer 4 and the sleeve 3 and preferably nesting at one end in a concentric pocket 10 in the confronting end of the first jack member 5.

As an abutment or stop for the plug-compressing jack mechanism 16, a stop collar 11 is positioned on the end of the tube 1 remote from flange 2, and the collar 11 is anchored in proper longitudinal adjustment by a radially extending set screw 12 which releasably engages the tube 1.

In use, the headed end of the drain tube 1 with the other components assembled thereon in the manner shown in the drawings is inserted into a pipe at a work location, until the plug or sleeve 3 is upstream of the joint to be soldered. Then holding one part or member of the jack mechanism 16, the other part or member thereof is rotated to extend the parts; with the second jack member 18 abutting the stop collar 11, the first jack member 16 forces the elongated cylinder 9 against the washer 4 to cause longitudinal compression and radial expansion of the plug or sleeve 3 into sealing engagement with the surrounding pipe. Thus with upstream water cut off from the joint, soldering can be effected.

Although the plumbing device 14 has been described as including a separate stop collar which can be releasably secured on the axial tube of the device, it is also possible to provide a releasable stop means directly on that one of the two screw jack members which is disposed nearer the second or rearward end of the axial tube of such a device, i.e. near that end of the tube which is remote from the external flange. Such an alternative construction will now be described with reference to FIG. 4 of the accompanying drawings.

In FIG. 4, there is shown generally at 20 a jack mechanism for use on a plumbing device in accordance with the invention. The device fragmentarily shown in FIG. 4 differs from the device 14 hereinbefore specifically described with reference to FIGS. 1 to 3 in that it comprises a solid axial shaft 21 instead of the axial tube 1 provided in the device 14. An axially resiliently compressible and radially outwardly resiliently extensible sleeve (not shown) is provided on the forward or first end of the shaft 21 in exactly the same manner as the sleeve 3 was provided on the forward or first end of the tube 1 of the device 14 while an elongated cylinder 22 is disposed co-axially about the shaft 21 so as to extend between that sleeve and the jack mechanism 20.

The jack mechanism 20 comprises a first jack member generally indicated at 24 and having an axial bore 25 slidably receiving the shaft 21. At its forward end, the bore 25 opens into a larger diameter socket 26 which together with the shaft 21 defines an annular pocket for receiving the rearward end of the elongated cylinder 22. The first jack member 24 also comprises a rearwardly open and internally threaded skirt 27. The peripheral outer surface of the jack member 24 is knurled as indicated at 28.

The jack mechanism 20 also comprises a second jack member 30 including an externally threaded shank 31 and a larger diameter head 32 having the same diameter as the jack member 24 and also provided along part of its peripheral outer surface with knurling 33, the male thread on the shank 31 co-acting with the female thread in the skirt 27.

Two internally threaded radial bores 36 are provided in the second jack member 30 to receive set screws 37 by means of which the second jack member 30 can be releasably secured in a desired position on the shaft 21.

It will now be understood that, by clamping the second jack member 30 in a desired position along the shaft 21 by means of the set screws 37, the sealing sleeve provided on the opposite end of the device can be expanded or released as desired simply by turning the first jack member 24 while holding the second jack member 30 to prevent bodily rotation of the device.

Figure 5:
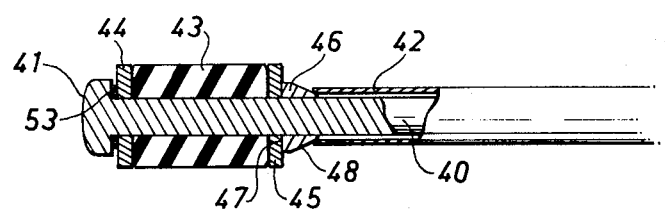
FIG. 5 is a fragmentary side elevation partly in section showing one embodiment of a centering means usefully provided in a plumbing device in accordance with this invention.

Referring next to FIG. 5, there is shown therein a device incorporating one type of centering means which is usefully provided in a plumbing device in accordance with this invention. The plumbing device shown fragmentarily in FIG. 5 comprises a solid axial shaft 40 which is formed at its first or forward end with an enlarged head 41. The device shown in FIG. 5 also includes an elongated cylinder 42 which is coaxially disposed about the axial shaft 40 and which is operative to transmit axial movement from a jack mechanism (not shown) to a rubber sleeve 43 slidably disposed on the shaft 40. Washers 44 and 45 are provided on the shaft 40 on opposite sides of the sleeve 43 and such washers have approximately the same diameter as the sleeve 43 when that sleeve is in its relaxed or non-expanded configuration as actually shown in FIG. 5.

Disposed between the rearward washer 45 and the forward end of the elongated cylinder 42, there is provided a centering collar 46 having a radially oriented planar front surface 47 for abutment with the washer 45 and a generally frusto-conical rear surface 48 which is received partially within the forward end of the elongated cylinder 42 as will readily be understood by reference to FIG. 5.

It will be understood that the centering means constituted by the collar 46 will serve to maintain the cylinder 42 essentially coaxial with the shaft 40 as well as to distribute the axially compressive load from that cylinder radially over the sleeve 43. This is particularly important when it is desired to use a single plumbing device in accordance with this invention with a number of rubber sleeves of different diameters for sealing pipes or conduits of different diameters.

Figure 6:
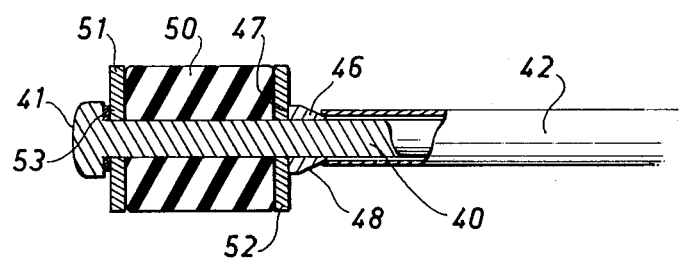
FIG. 6 is a fragmentary side elevation partly in section and similar to that of FIG. 5 but showing a larger diameter sealing sleeve fitted on the same device.

Referring now to FIG. 6, there is shown therein the disposition of a larger diameter rubber sleeve 50 on the device of FIG. 5. It will be noted that the washers 44 and 45 shown in FIG. 5 have also been replaced with correspondingly larger diameter washers 51 and 52. To replace the sleeve on a device such as that described with reference to FIGS. 5 and 6, it is necessary simply to release the jack mechanism from the axial shaft and then to slide that jack mechanism and the elongated cylinder 42 from that shaft. The rubber sleeve, such as the sleeve 43, and its associated washers 44 and 45 can then be slid from the shaft 40 and replaced with a sleeve and washers of different diameter, for example, with the sleeve 50 and the washers 51 and 52 shown in FIG. 6.

A fiber washer 53 is usefully provided as shown between the enlarged head 41 and the adjacent washer 44 or 51 to prevent leakage between the shaft 40 and the surrounding rubber sleeve 43 or 50.

Figure 7:
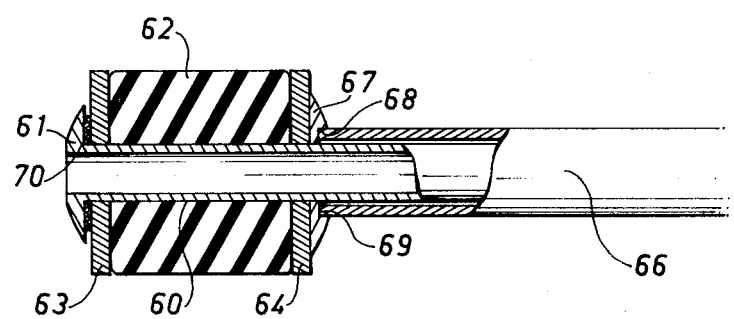
FIG. 7 is a fragmentary side elevation partly in section showing an alternative construction for a centering means optionally provided on a device according to the invention.

Referring now to FIG. 7, there is shown therein an alternative type of centering means for optional use in a plumbing device according to this invention. The plumbing device shown fragmentarily in FIG. 7 includes an axial tube 60 which is provided at its front or forward end with a radially outwardly extending flange 61. A rubber sleeve 62 and washers 63 and 64 are slidably disposed on the axial tube 60 so that the sleeve 62 can be axially compressed by operation of a jack mechanism (not shown) provided in proximity to the rearward or second end of the tube 60, the compressing force being applied to the sleeve 62 by an elongated cylinder 66 through a centering collar 67 and the washer 64.

The centering collar 67 is formed in its rearwardly facing face with an axial recess 68 which together with the axial tube 60 defines an annular pocket 69 for receiving the forward end of the elongated cylinder 66. A fiber washer 70 is usefully provided between the flange 61 and the adjacent washer 63.

What is claimed is:
1. A plumbing device which comprises:
an elongated axial shaft having first and second ends;
a radially outwardly extending flange on said shaft in proximity to said first end thereof;
a radially outwardly resiliently expansible and axially resiliently compressible sealing sleeve disposed about said shaft;
a first jack member slidably disposed on said shaft toward said second end thereof and including an internally threaded skirt defining with said shaft an annular socket;

a second jack member slidably disposed on said shaft toward said second end thereof and including an externally threaded shank received within said annular socket of said first jack member for co-action therewith whereby, on relative rotation of said first and second jack members, those members are caused to undergo relative axial movement;

a releasable stop means for releasably preventing axial movement toward said second end of said shaft of that one of said first and second jack members which is nearer said second end of said shaft; and an elongated cylinder disposed about said shaft to be axially slidable therealong and extending between said sleeve and a nearer one of said first and second jack members; whereby, when said stop means is operative to prevent axial movement of one of said first and second jack members on said shaft and when said first and second jack members are relatively rotated to cause axial separation thereof, said elongated cylinder is moved axially to cause compression of said sleeve against said flange and consequently radially outward expansion of said sleeve.

2. A plumbing device as claimed in claim 1 in which said releasable stop means comprises a stop collar axially slidable along said shaft and securable thereon at a desired position thereon for axial abutment by that one of said first and second jack members which is nearer said second end of said shaft.

3. A plumbing device as claimed in claim 2 in which a set screw is threaded in a radial bore in said stop collar for engagement of said screw with said shaft so to prevent axial movement relative to said shaft of that one of said jack members which is nearer said second end of said shaft.

4. A plumbing device as claimed in claim 1 in which said releasable stop means comprises a locking member radially movably mounted on that one of said first and second jack members which is nearer said second end of said shaft.

5. A plumbing device as claimed in claim 4 in which said locking member comprises a set screw threaded into a radial bore in that one of said first and second jack members which is nearer said second end of said shaft for engagement of said screw with said shaft so to prevent axial movement relative to said shaft of that one of said jack members which is nearer said second end of said shaft.

6. A plumbing device as claimed in claim 1 in which said shaft is in the form of a hollow tube.

7. A plumbing device as claimed in claim 1 which additionally comprises a centering means disposed between said sealing sleeve and an adjacent end of said elongated cylinder for maintaining said cylinder and said shaft essentially coaxial with each other.

8. A plumbing device as claimed in claim 7 in which said centering means comprises a centering collar slidably disposed about said shaft between said sleeve and said elongated cylinder and including a recess receiving the adjacent end of said elongated cylinder.

9. A plumbing device as claimed in claim 7 in which said centering means comprises a centering collar slidably disposed about said shaft between said sleeve and said cylinder and dimensioned so as to extend partially into said cylinder.

10. A plumbing device as claimed in claim 9 in which said centering collar includes a frusto-conical external surface for abutment by the adjacent end of said elongated cylinder.

11. A plumbing device as claimed in claim 1 which additionally comprises first and second discoid washers slidably disposed on said shaft on opposite sides of said sealing sleeve, said discoid washers having approximately the same diameter as said sealing sleeve when said sleeve is in a relaxed configuration thereof.

12. A plumbing device as claimed in claim 1 in which that one of said first and second jack members which is nearer said elongated cylinder is formed with a socket defining with said shaft an annular pocket in which the adjacent end of said elongated cylinder is received.

* * * * *